O. B. WICKHAM.
LOCKING-VALVE.
No. 182,046. Patented Sept. 12, 1876.
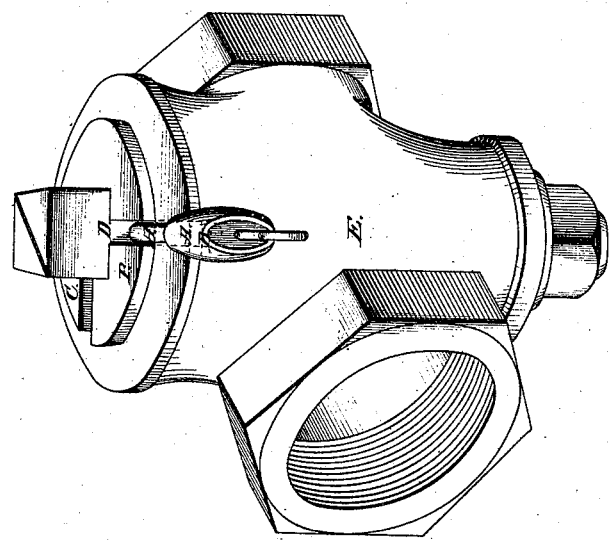
Attest:
Henry E. Wrigley
Samuel Grumbine
Inventor
Owen B. Wickham

UNITED STATES PATENT OFFICE.

OWEN B. WICKHAM, OF TITUSVILLE, PENNSYLVANIA.

IMPROVEMENT IN LOCKING-VALVES.

Specification forming part of Letters Patent No. 182,046, dated September 12, 1876; application filed February 14, 1876.

*To all whom it may concern:*

Be it known that I, OWEN B. WICKHAM, of the city of Titusville, Crawford county, and State of Pennsylvania, have invented an Improved Method of Locking Stop-Cocks or Valves, of which the following is a specification:

In the transmission of fluids through pipes for commercial, domestic, or other purposes, it often becomes desirable not only to shut off the supply, but to prevent the same being turned on again by any one so inclined. An instance of this occurs particularly in the transportation of petroleum-oil through pipe-lines from the tanks of the several wells. Devices heretofore designed for this purpose have comprised something outside of, and detached from, the stop-cock or valve itself, and which, although padlocked to the stop-cock, could still be cut away, and the plug turned.

By the arrangement here shown the plug cannot be turned without the destruction of the stop-cock itself, which, in the case of a pipe-line or similar business, would give notice of the fact to the operator.

In the drawing, E is an ordinary stop-cock with the usual plug. Through the bell or body of the stop-cock an opening, B, is made, as shown by the dotted lines. The top of the plug P is provided with the slotted openings C and D at right angles to each other, one parallel and one at right angles with the line of flow through the pipe.

When the plug is turned so that the slot D corresponds with the opening B in the body of the cock, the padlock A can be passed through both, and thus lock the plug open. When the plug is turned so that the slot C corresponds with the opening B in the body of the cock, the padlock A can be passed through both, and thus lock the plug shut.

I claim as my invention—

The construction of a stop-cock or valve with slotted openings C D, as shown, in the plug to correspond with an opening, B, in the body of the valve, in combination with a padlock, A, for the purpose of controlling the transmission of fluid through a pipe.

OWEN B. WICKHAM.

Witnesses:
 HENRY E. WRIGLEY,
 SAMUEL GRUMBINE.